US 8,098,879 B2

(12) United States Patent
Murayama

(10) Patent No.: US 8,098,879 B2
(45) Date of Patent: Jan. 17, 2012

(54) INFORMATION PROCESSING DEVICE, IMAGE MOVEMENT INSTRUCTING METHOD, AND INFORMATION STORAGE MEDIUM

(75) Inventor: Takanori Murayama, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1143 days.

(21) Appl. No.: 11/885,638

(22) PCT Filed: Dec. 21, 2005

(86) PCT No.: PCT/JP2005/023531
§ 371 (c)(1),
(2), (4) Date: Sep. 5, 2007

(87) PCT Pub. No.: WO2006/095488
PCT Pub. Date: Sep. 14, 2006

(65) Prior Publication Data
US 2008/0170752 A1    Jul. 17, 2008

(30) Foreign Application Priority Data

Mar. 7, 2005  (JP) .................... 2005-062289

(51) Int. Cl.
G06K 9/00 (2006.01)
G06K 9/36 (2006.01)
G06K 9/46 (2006.01)
H04N 1/40 (2006.01)
H04N 7/167 (2006.01)
H04L 9/00 (2006.01)

(52) U.S. Cl. ........ 382/100; 382/103; 382/232; 382/233; 380/44; 380/201; 358/3.28

(58) Field of Classification Search ................ None
See application file for complete search history.

(56) References Cited

U.S. PATENT DOCUMENTS
5,655,136 A    8/1997  Morgan
(Continued)

FOREIGN PATENT DOCUMENTS
JP      7-56679 A     3/1995
JP      8-504987 A    5/1996
JP      8-315167 A    11/1996
(Continued)

OTHER PUBLICATIONS
Japanese Office Action dated Jul. 21, 2009 in corresponding Japanese Patent Application No. 2006-076611.

Primary Examiner — Tom Y Lu
Assistant Examiner — Thomas Conway
(74) Attorney, Agent, or Firm — Sughrue Mion, PLLC

(57) ABSTRACT

To provide an information processing device, an image movement instructing method, and an information storage medium for selecting any of a plurality of images in a simple operation and for designating a destination to which to move the selected image or images. The image processing device comprises an image displaying unit for displaying one or more images on a display screen; a track acquiring unit for acquiring a finite track at a position designated by a user on the display screen; an image selecting unit for selecting some or all of the one or more object images based on the track acquired by the track acquiring unit; and an image moving unit for moving the object image selected by the image selecting unit to a position in accordance with an end point of the track acquired by the track acquiring unit.

8 Claims, 8 Drawing Sheets

U.S. PATENT DOCUMENTS

| | | |
|---|---|---|
| 6,240,207 B1 | 5/2001 | Shinozuka et al. |
| 7,554,530 B2 * | 6/2009 | Mizobuchi et al. ........... 345/173 |
| 2003/0058284 A1 | 3/2003 | Toh et al. |
| 2003/0064736 A1 | 4/2003 | Bickerton et al. |
| 2004/0119763 A1 | 6/2004 | Mizobuchi et al. |

FOREIGN PATENT DOCUMENTS

| | | |
|---|---|---|
| JP | 10-091323 A | 4/1998 |
| JP | 2003-84884 A | 3/2003 |
| JP | 2004-046513 A | 2/2004 |
| KR | 2003-19619 A | 3/2003 |

* cited by examiner

FIG.4

| OBJECT ID | PRECEDING OBJECT ID | SUBSEQUENT OBJECT ID | POSITION, DIRECTION | ATTRIBUTE |
|---|---|---|---|---|
| 001 (60a) | NULL | NULL | ... | ... |
| 002 (60b) | NULL | NULL | ... | ... |
| 003 (60c) | NULL | NULL | ... | ... |
| 004 (60d) | NULL | NULL | ... | ... |
| 005 (60e) | NULL | NULL | ... | ... |
| 006 (60f) | NULL | NULL | ... | ... |

FIG.5

| OBJECT ID | PRECEDING OBJECT ID | SUBSEQUENT OBJECT ID | POSITION, DIRECTION | ATTRIBUTE |
|---|---|---|---|---|
| 001 (60a) | NULL | NULL | ... | ... |
| 002 (60b) | NULL | 003 | ... | ... |
| 003 (60c) | 002 | 004 | ... | ... |
| 004 (60d) | 003 | 005 | ... | ... |
| 005 (60e) | 004 | NULL | ... | ... |
| 006 (60f) | NULL | NULL | ... | ... |

(a)    (b)

(a)         (b)

INFORMATION PROCESSING DEVICE, IMAGE MOVEMENT INSTRUCTING METHOD, AND INFORMATION STORAGE MEDIUM

TECHNICAL FIELD

The present invention relates to an information processing device, an image movement instructing method, and an information storage medium, and in particular to a new user interface for desirably selecting some or all of a plurality of images and designating a destination to which to move the selected image or images.

BACKGROUND OF ART

As a method for moving an image, such as an icon or the like, displayed on a computer screen, using a pointing device, such as a mouse or the like, a method referred to as "drag and drop" is available. According to this method, a cursor shown on a computer screen can be moved, using a pointing device. Specifically, a button on the pointing device is pressed to thereby designate the icon located where the cursor is then shown; the cursor is moved with the button kept pressed; and the pressed button is released. With the above, the icon can be moved to where the cursor is shown when the pressed button is released. According to this method, the icon can be moved in an intuitive operation.
[Patent Document 1] Japanese Patent Laid-Open Publication No. 2003-84884

DISCLOSURE OF THE INVENTION

Problems to be Solved by the Invention

However, "drag and drop" is not necessarily convenient in moving the display positions of a plurality of icons. That is, in an attempt to move the display positions of a plurality of icons, using "drag and drop", a complicated operation results as icons to be moved need to be designated one by one by using the cursor or being enclosed by a rectangle drawn using the cursor.

The present invention has been conceived in view of the above, and aims to provide an information processing device, an image movement instructing method, and an information storage medium for selecting any of a plurality of images and designating a designation to which to move the selected icon, in a simple operation.

Means for Solving the Problem

In order to address the above, according to one aspect of the present invention, there is provided an information processing device, comprising image displaying means for displaying one or more images on a display screen; track acquiring means for acquiring a finite track at a position designated by a user on the display screen; image selecting means for selecting some or all of the one or more images based on the track acquired by the track acquiring means; and image moving means for moving the image selected by the image selecting means to a position in accordance with an edge point of the track acquired by the track acquiring means.

According to another aspect of the present invention, there is provided an information processing method, comprising an image displaying step of displaying one or more images on a display screen; a track acquiring step of acquiring a finite track at a position designated by a user on the display screen; an image selecting step of selecting some or all of the one or more images based on the track acquired at the track acquiring step; and an image moving step of moving the image selected at the image selecting step to a position in accordance with an edge point of the track acquired at the track acquiring step.

According to still another aspect of the present invention, there is provided a computer readable information storage medium recording a program for causing a computer to function as image displaying means for displaying one or more images on a display screen; track acquiring means for acquiring a finite track at a position designated by a user on the display screen; image selecting means for selecting some or all of the one or more images based on the track acquired by the track acquiring means; and image moving means for moving the image selected by the image selecting means to a position in accordance with an edge point of the track acquired by the track acquiring means.

It should be noted here that the computer may be, for example, a home-use game machine, a commercial game machine, a portable game device, a personal computer, a portable digital assistant, a portable phone, and so forth. A program may be stored in any computer readable information storage medium such as a CD-ROM, a DVD-ROM, a ROM cartridge, and so forth.

In one embodiment of the present invention, when the user designates a finite track on the display screen, an image may be selected based on the track, and the selected image moves to the edge point of the track. The track may be specified, for example, by a plurality of points through which the track designated by the user passes. In this case, the image may be selected based on these plurality of points. According to the present invention, the user can select any of a plurality of images in a simple operation, and also designate a destination to which to move the selected image or images.

In one embodiment of the present invention, the image selecting means may select an image, among the one or more images, which is enclosed by the track acquired by the track acquiring means. The image moving means may move the image selected by the image selecting means to the endpoint of the track acquired by the track acquiring means.

In one embodiment of the present invention, the image moving means may have means for aligning the images selected by the image selecting means on the display screen according to a predetermined rule.

BRIEF DESCRIPTION OF THE DRAWINGS

FIG. 4 is a diagram showing a structure of an object database;

FIG. 5 is a diagram showing a structure of the object database;

BEST MODE FOR CARRYING OUT THE INVENTION

In the following, one embodiment of the present invention will be described in detail with reference to the accompanying drawings.

Figure 1:
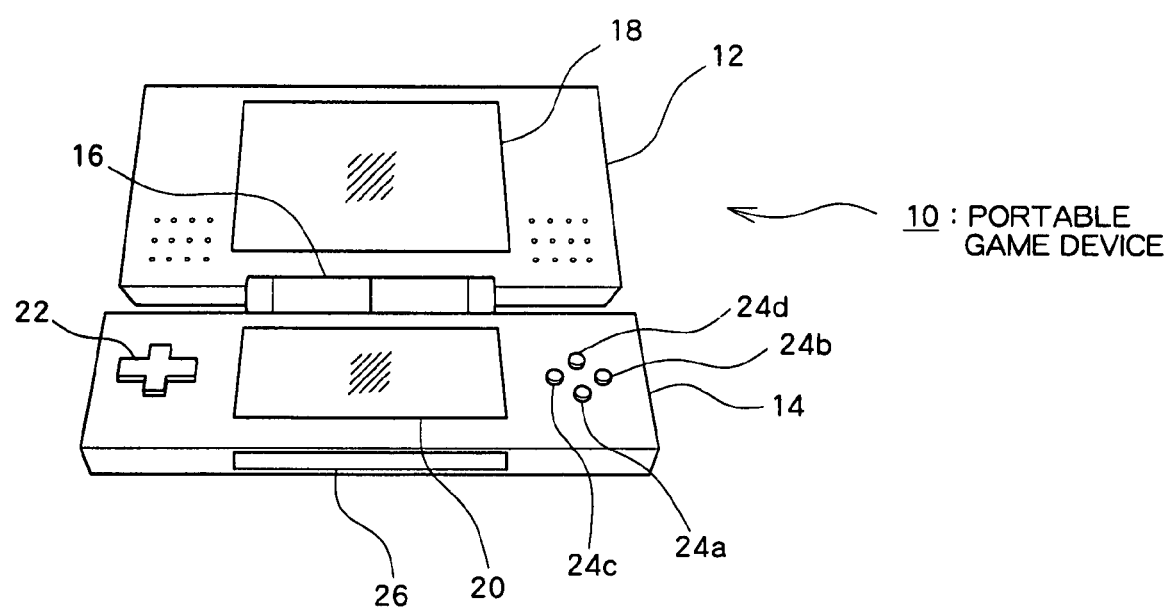
FIG. 1 is a diagram showing an external appearance of a portable game device according to an embodiment of the present invention.

FIG. 1 is a diagram showing an external appearance of a portable game device according to this embodiment. The shown portable game device 10 comprises an upper enclosure 12 and a lower enclosure 14. The upper enclosure 12 is connected to the lower enclosure 14 via a hinge 16. As shown in FIG. 1, the portable game device 10 takes a play position which allows the user to look at the front surfaces of the upper enclosure 12 and the lower enclosure 14 and a folded position in which the front surfaces of the upper enclosure 12 and the lower enclosure 14 are placed together. Using the portable game device 10, the user can play a game anywhere using a battery.

On the front surface of the upper enclosure 12, a liquid crystal display panel 18 is provided. The upper enclosure 12 incorporates a speaker. On the front surface of the lower enclosure 14, a touch screen 20, a cross key 22, buttons 24a, 24b, 24c, and 24d are provided. The touch screen 20 is formed by placing a known touch panel (the touch panel 56 in FIG. 2) on a known liquid crystal display panel (the first liquid crystal display panel 40 in FIG. 2). A cartridge slot 26 is defined on the lateral side on the front side of the lower enclosure 14, so that a game cartridge can be inserted and removed with respect to the cartridge slot 26. Another cartridge slot 26 (not shown) is provided on the lateral side on the back side of the lower enclosure 14. It should be noted that other members (not shown) such as a power switch or the like are additionally provided to the portable game device 10.

Figure 2:
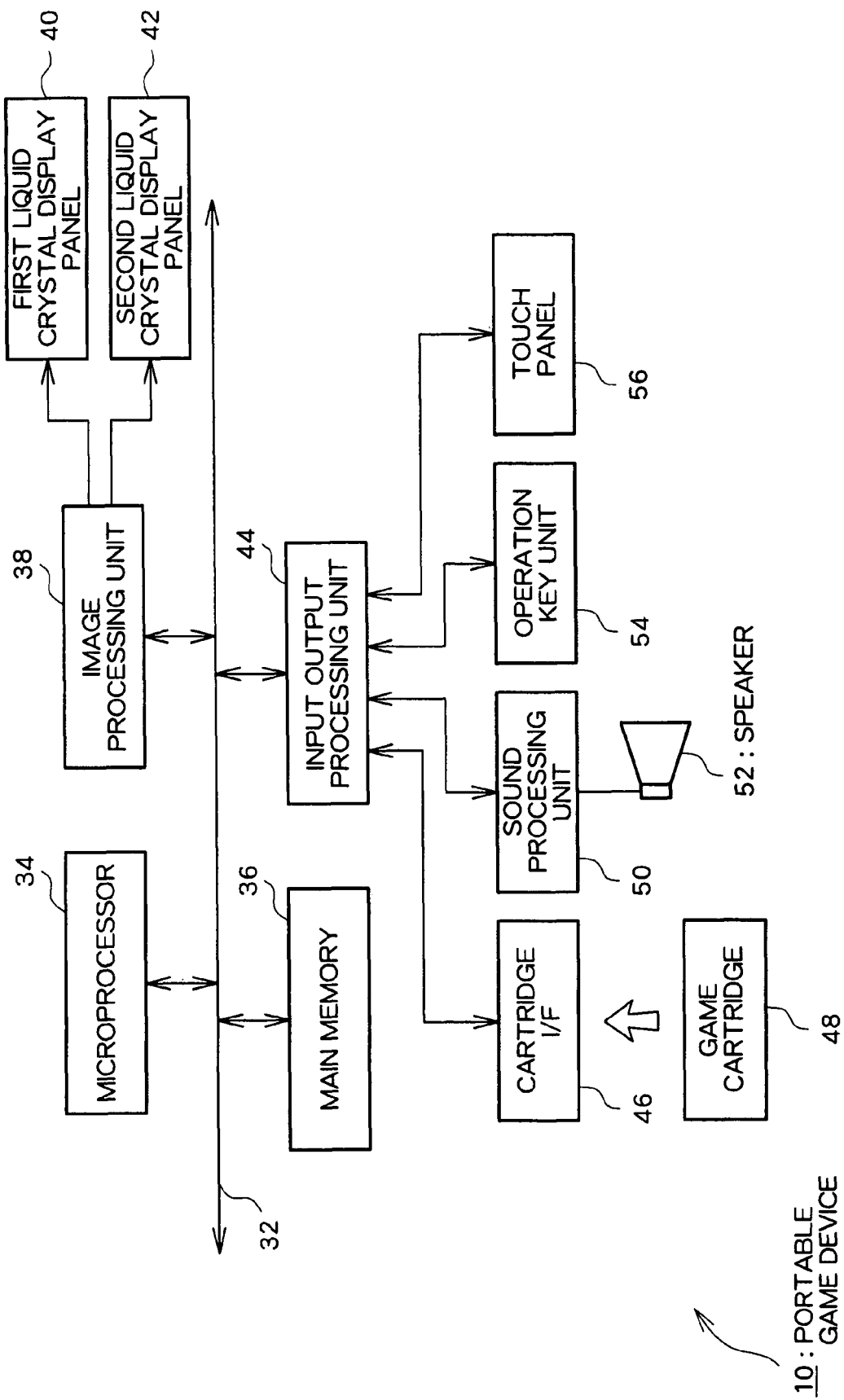
FIG. 2 is diagram showing a hardware structure of the portable game device according to the embodiment of the present invention.

FIG. 2 shows a hardware structure of the portable game device 10. The portable game device 10 according to this embodiment is a publicly known computer game system, in which a game cartridge incorporating a ROM is mounted in a cartridge interface (cartridge I/F) 46 so that a game program stored in the ROM is read into the portable game device 10. Although a game cartridge 48 is used here to provide a game program to the portable game device 10, any other computer readable information storage medium, such as a CD-ROM, a DVD, or the like, may be usable. Alternatively, a game program may be provided from a remote place via a communication network such as the Internet or the like, or provided utilizing various data communications such as infrared-ray communication or the like from an installed game machine, a personal computer, or the like to the portable game device 10.

The portable game device 10 is a publicly known computer game system which comprises a bus 32, a microprocessor 34, a main memory 36, an image processing unit 38, a first liquid crystal display panel 40, a second liquid crystal display panel 42, an input output processing unit 44, a cartridge I/F 46, a sound processing unit 50, a speaker 52, an operation key unit 54, and a touch panel 56. These elements, as well as a battery, are accommodated in an enclosure to be portable, and driven by the battery.

The bus 32 is used for exchanging an address and data among the respective units of the portable game device 10. The microprocessor 34, the main memory 36, the image processing unit 38, and the input output processing unit 44 are mutually connected via the bus 32 for data transmission.

The microprocessor 34 controls the respective units of the portable game device 10 based on an operation system stored in a ROM (not shown) and a program read from the game cartridge 48. The main memory 36 comprises a RAM, for example, into which a program read from the game cartridge 48 is written when required. The main memory 36 is used also as a working memory of the microprocessor 34.

The first liquid crystal display panel 40 and the second liquid crystal display panel 42 are formed using known liquid crystal display panels. The first liquid crystal display panel 40 comprises a liquid crystal display panel which constitutes the touch screen 20 on the lower enclosure 14. The second liquid crystal display panel 42 comprises the liquid crystal display panel 18 of the upper enclosure 12. The image processing unit 38 outputs, to display, game image data produced by the microprocessor 34 to the first liquid crystal display panel 40 and/or second liquid crystal display panel 42 at a predetermined timing.

The input output processing unit 44 is an interface via which the microprocessor 34 accesses the cartridge I/F 46, the sound processing unit 50, the operation key unit 54, and the touch panel 56. The cartridge I/F 46, the sound processing unit 50, the operation key unit 54, and the touch panel 56 are connected to the input output processing unit 44.

The cartridge I/F 46 has an opening where the game cartridge 48 is accommodated, and, at a deep end thereof, a signal input/output terminal is formed. With the game cartridge 48 pressed into the opening such that the signal input/output terminal is brought into contact with the terminal (not shown) of the game cartridge 48, signal exchange is enabled with respect to the game cartridge 48.

The sound processing unit 50 comprises a sound buffer, and outputs via the speaker 52 various sound data such as game music, game sound effects, a message, and so forth read from the game cartridge 48 and stored in the sound buffer.

The operation key unit 54 is an input means via which the user operates the game, and comprises the cross key 22, the buttons 24a, 24b, 24c, 24d, and so forth, shown in FIG. 1. The input output processing unit 44 scans the state of the units of the operation key unit 54 every constant cycle (for example, every 1/60 seconds), and sends an operational signal indicative of the scanned result via the bus 32 to the microprocessor 34. The microprocessor 34 having received the signal determines the game operation carried out by the user, based on the received operational signal.

The touch panel 56 is an input means via which the user inputs a game operation. The touch panel 56 obtains position coordinates indicative of a position on the touch screen 20, the position pressed by the user's finger or a stylus, for every predetermined period of time, and supplies the obtained position coordinates to the microprocessor 34.

The touch panel 56 is a touch panel employing a known resistive film method (a pressure sensitive method), and placed on the first liquid crystal panel 40, as described above. That is, the touch panel 56 comprises an upper conductive film (a resistive film) and a lower conductive film (a resistive film). A space is defined between the films, so that these films are brought into contact with each other and conduct electricity only when the touch panel 56 is pressed. The touch panel 56 detects a voltage which is output when the upper conductive film contacts the lower conductive film, and outputs the position coordinates of the position pressed, the position coordinates obtained based on the output voltage.

It should be noted that, although it is described here that the touch panel 56 comprises a touch panel employing a resistive film method, the touch panel 56 may comprise a touch panel employing another method. In this embodiment, when the user directly or indirectly touches any point on the touch panel 56, then moves on the touch panel 56 while touching, and finally stops the touching, that is, removes their hand from the touch panel 56, a track having a finite length can be input to the portable game device 10.

In the following, a method for realizing an information processing device capable of selecting any of a plurality of images in a simple operation and designating a destination to which to move the image, using the portable game device 10 having the above-described hardware structure, will be described.

Figure 3:
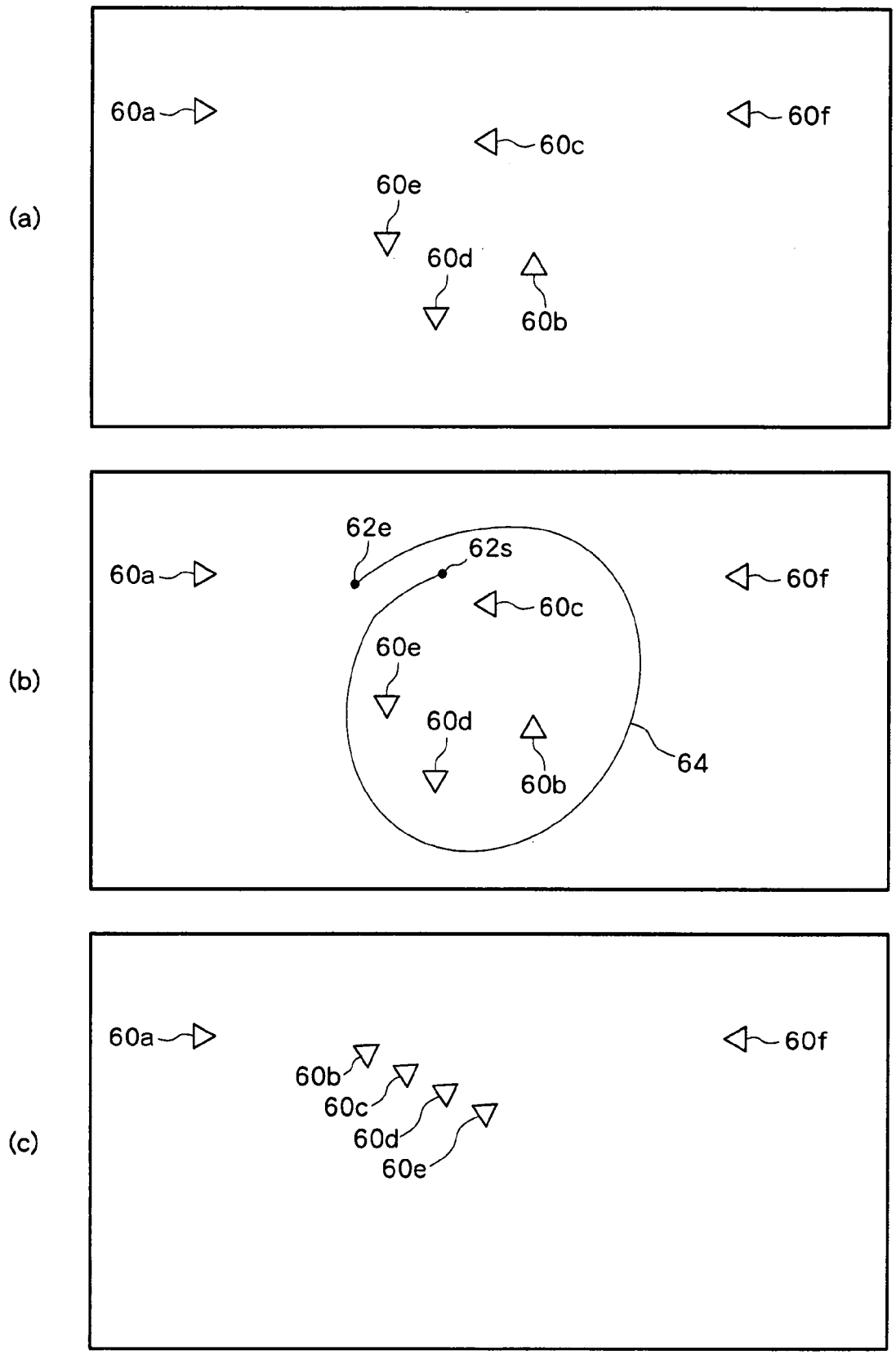
FIG. 3 is a diagram showing the game screen images before and after the user inputs a track.

FIG. 3 shows one example of a game screen image shown on the touch screen 20. In particular, FIG. 3(a) shows a game screen image prior to user instruction on image moving; FIG. 3(b) shows a game screen with user instruction on image moving; and FIG. 3(c) shows a game screen with the image having moved according to the user instruction.

According to the portable game device 10, when the user touches the front surface of the touch screen 20, using a stylus or the like, the touched position is input to the portable game device 10. In FIG. 3 (a), object images 60a to 60f, each representing a game character, for example, are shown in the game screen image which is displayed on the touch screen 20. With the game screen image shown, the user touches the touch start position 62s on the touch screen 20, using a stylus or the like, then moves while touching (with the stylus or the like kept touching the touch screen 20) so as to draw a line enclosing the object images 60b to 60e, and finally removes the stylus or the like from the touch screen 20 at the touch end position 62e, as shown in FIG. 3 (b). With the above, a track 64 having the finite length from the touch start position 62s to the touch end position 62e can be input to the portable game device 10. As described above, the track 64 is input as a plurality of position coordinates on the track 64 (a position coordinate array) into the portable game device 10.

In this portable game device 10, the object images 60b to 60e, that is, the object images, which are enclosed by the track 64 input as described above, are selected among those 60a to 60f as objects to be moved. Thereafter, the thus selected object images 60b to 60e move on the first liquid crystal display panel 40 towards the touch end position 62e, or the end point of the track 64, as shown in FIG. 3(c). In the above, the object images 60b to 60e, while moving towards the touch end position 62e, come to be aligned from closer to farther with respect to the touch end position 62e in the order determined according to a predetermined rule. The predetermined rule may be, for example, an ascending or descending order of the various attribute values of the object images 60b to 60e (for the object images 60b to 60e being game characters, the various attribute values thereof).

As described above, in this portable game device 10, a track 64 having a finite length is drawn on the touch screen 20, using a stylus or the like, so as to enclose one or more object images 60b to 60e to be moved, and the enclosed object image or images 60b to 60e can be moved towards the touch end position 62e, or the end point of the track 64. Moreover, the object images 60b to 60e, while moving, are aligned in a predetermined order.

FIGS. 4 and 5 are diagrams showing an example structure of an object database stored and updated in the main storage 36 for realizing the user interface. In particular, FIG. 4 shows the content of the object database before movement instruction is made with respect to the object images 60a to 60f; FIG. 5 shows the content of the object database after movement instruction is made with respect to the object images 60a to 60f. As shown in FIG. 4, the object database stores an object ID identifying each of the object images 60a to 60f shown on the touch screen 20, the object ID (a preceding object ID) of the object image 60a to 60f located immediately before that object image 60a to 60f aligned on the touch screen 20, the object ID (a subsequent object ID) of the object image 60a to 60f located immediately after that object image 60b to 60e aligned on the touch screen 20, a display position and direction of that object image 60a to 60f on the touch screen 20, and the attribute of that object image 60a to 60f, all shown in the manner of being associated with one another. In the database before movement instruction is made with respect to the object images 60a to 60f, "NULL" meaning none is stored for the preceding object ID and the subsequent object ID.

After the user instructs to move the object images 60b to 60e, as shown in FIG. 3(b), the preceding object ID, subsequent object ID, and position and direction of the selected object image 60b to 60e are updated. Specifically, the attributes of the selected object images 60b to 60e are read from the object database, and the selected object images 60b to 60e are ordered according to the attribute values thereof read. Thereafter, the object ID of the object image 60b to 60e located immediately before an object image 60b to 60e aligned as ordered is stored in the column of the preceding object ID of that object image 60b to 60e, and the object ID of the object image 60b to 60e located immediately after that object image 60b to 60e aligned as ordered is stored in the column of the subsequent object ID of that object image 60b to 60e. "NULL" is stored in the column for the preceding object ID of the top object image 60b to 60e in the alignment, and also in the column for the subsequent object ID of the end object image 60b to 60e in the alignment. In the above, the display position and direction of each object image 60b to 60e after movement is stored in the column for the position and direction.

Figure 6:
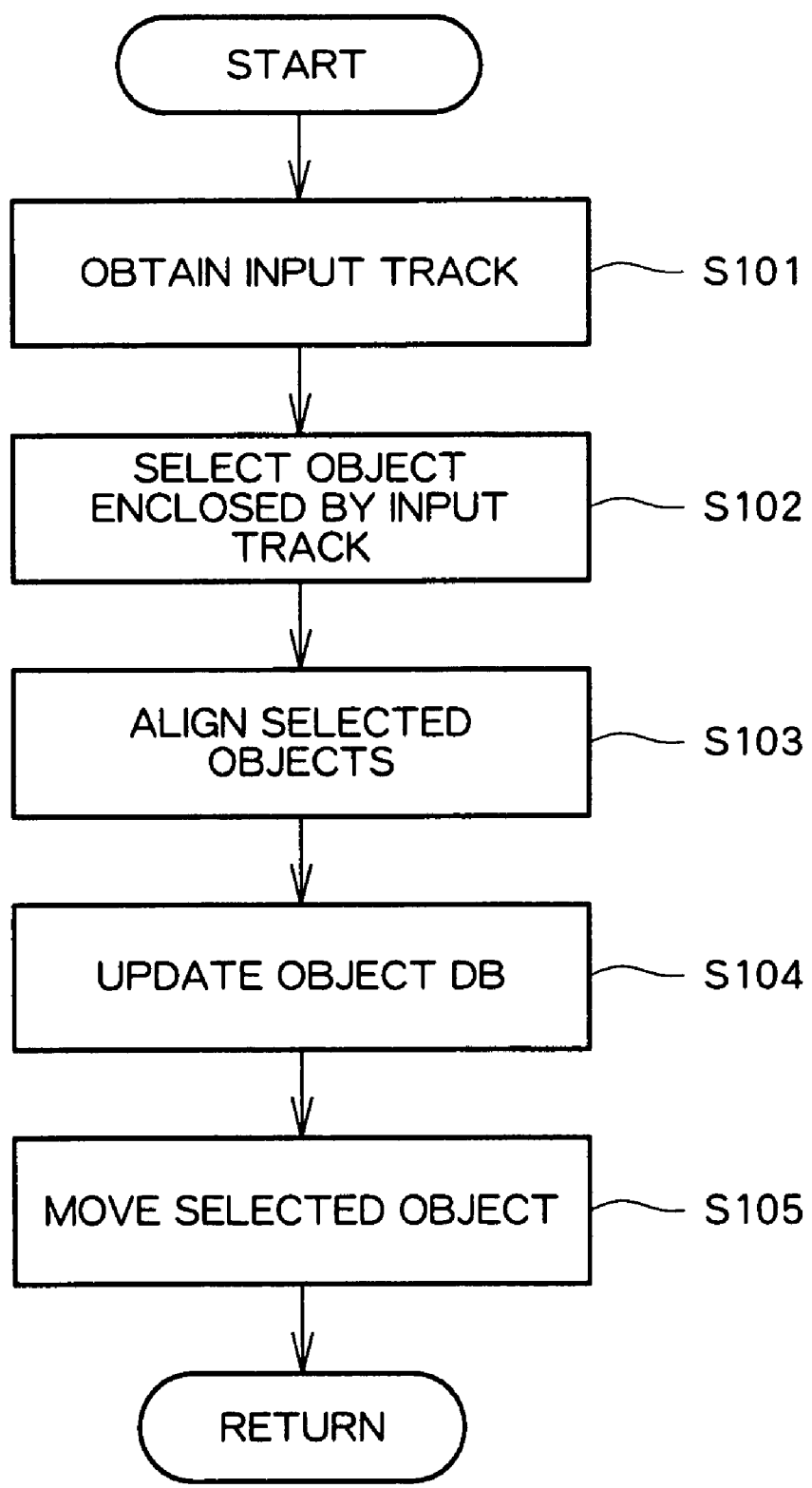
FIG. 6 is a flowchart of an object image moving process.
Figure 7:
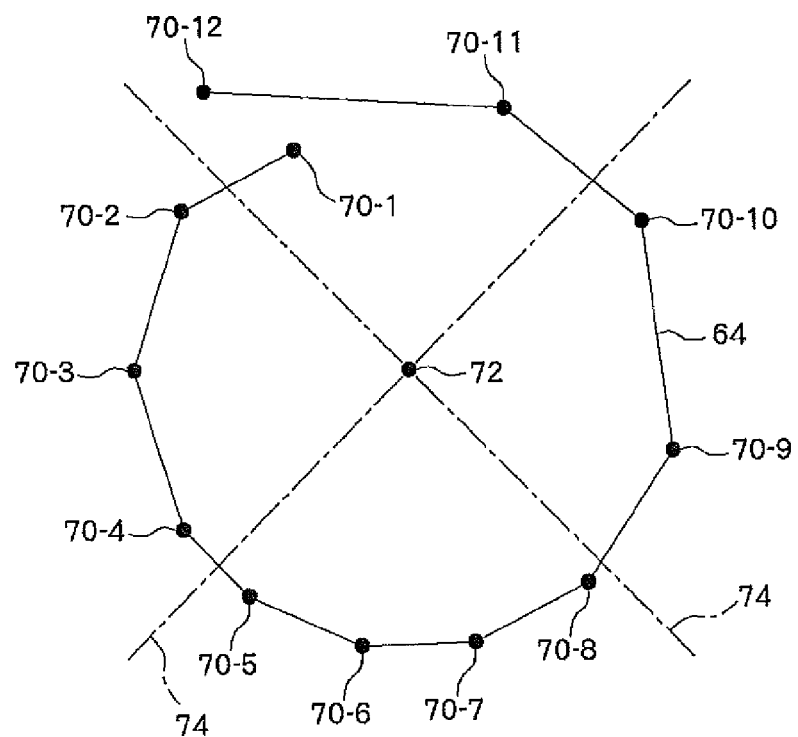
FIG. 7 is a diagram explaining a process for determining an object image enclosed by the track input by the user.
Figure 11:
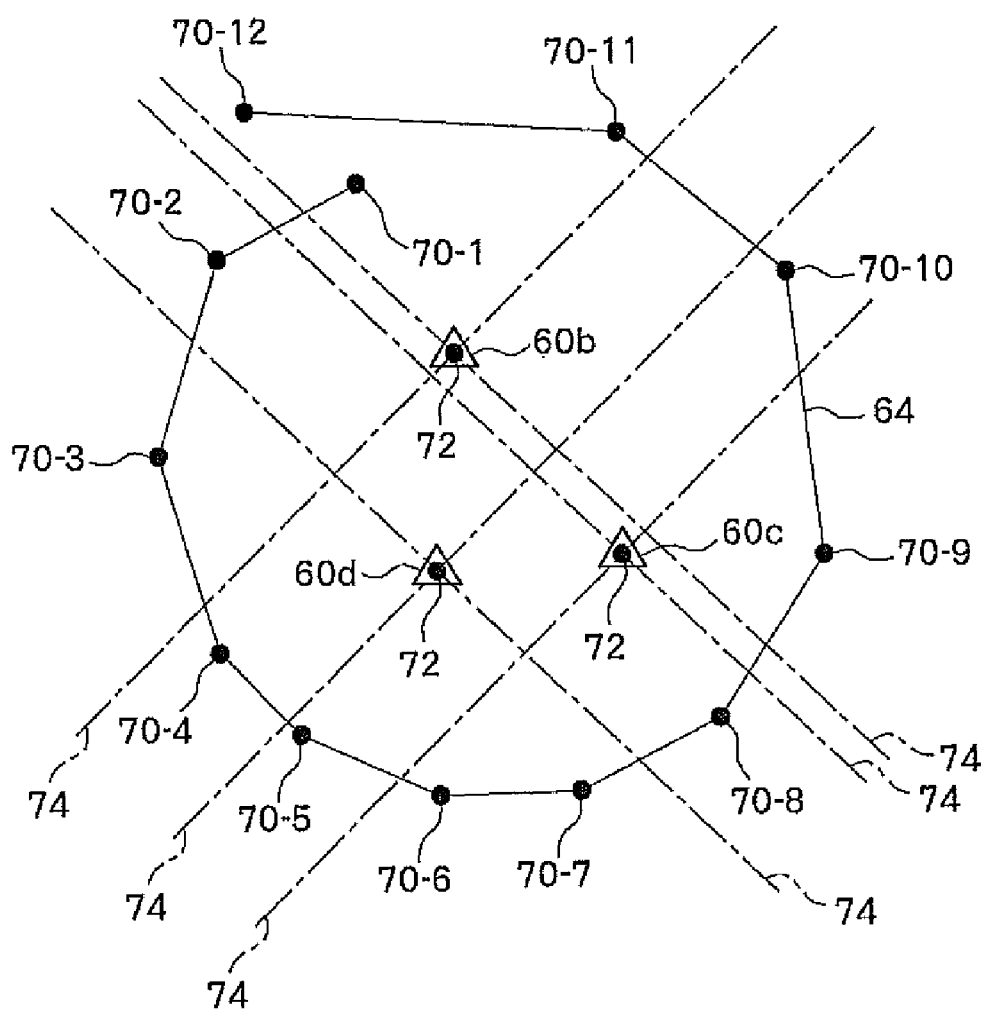
FIG. 11 is a diagram explaining a process for determining object images enclosed by the track input by the user.

FIG. 6 is a flowchart of an object image moving process to be carried out by the portable game device 10 according to this embodiment. The shown object image moving process is realized by the microprocessor 34 by executing a program stored in the game cartridge 48. In the process, initially, data on the track 64 on the touch screen 20 is obtained (S 101). Here, the data on the track 64 contains a plurality of position coordinates 70-1 to 70-12 on the track 64, as shown in FIG. 7. Thereafter, the portable game device 10 selects an object image 60b to 60e enclosed by the track 64 (S 102). In the above, it is determined, for example, whether or not all of the plurality of (for example, two) virtual straight lines 74 each passing through the display position 72 of each object image 60b to 60e on the touch screen 20 and extending in a predetermined direction intersect the track 64 at two points with the display position 72 of the object image 60b to 60e located between the intersections, as shown in FIG. 11. When it is determined that all of the plurality of virtual straight lines 74 have two such intersections with the track 64, it is then determined that the object image 60b to 60e is enclosed by the track 64.

After the determination, the respective attributes of the object images 60b to 60e selected by the track 64 are read from the object database, and the ascending or descending order thereof is determined to thereby determine the alignment order of the selected object images 60b to 60e (S 103). Then, the display position and direction of each object image 60b to 60e having moved and the preceding and subsequent object ID's thereof are written in the object database (S 104). Then, the respective selected object images 60b to 60e are moved on the touch panel 20 so as to be aligned in the determined order, directing to the position coordinates 70-12, or the end point of the track 64 (S 105), before the process ends.

According to the above-described portable game device 10, a plurality of object images 60a to 60f are shown on the touch screen 20, or a display screen, and a finite track 64 at a position designated by the user on the touch screen 20 is obtained. Then, some or all of the plurality of object images 60a to 60f are selected based on the obtained track 64, and then moved to the touch end position 62e, or the terminal point of the obtained track 64. With this arrangement, the user is required only to touch the user touch screen 20, using a stylus or the like, to draw the track 64, and to remove the stylus or the like from the touch screen 20 in order to move the object image 60b to 60e enclosed by the track 64 toward the touch end position 62e, or the end point of the track 64. That is, it is possible to select any of a plurality of images in a simple operation, and to designate a destination to which to move the image. In the above, the object images 60b to 60e are aligned in the order according to the attributes thereof, which can improve the user convenience.

It should be noted that the present invention is not limited to the above described embodiment.

For example, although the touch screen 20 (the touch panel 56) is used to input the track 64 in the above-described embodiment, alternatively, a pointing device, such as a mouse or the like, may be used to input the track 64 having a finite length. In this case, while a cursor is shown on the display screen, the portion of the track, the portion drawn with the button on the pointing device kept pressed is used as the track 64 having a finite length.

The present invention is applicable not only to the portable game device 10 but also to any other computer.

Figure 8:
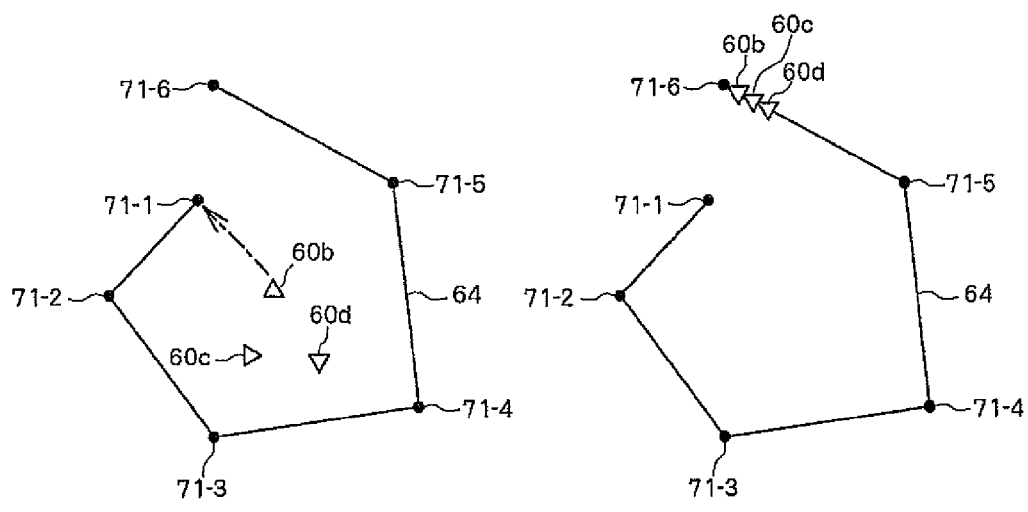
FIG. 8 is a diagram showing another path along which the object image moves.

The selected object image 60b to 60e may be moved to the touch end position 62e not only straightforward but also along other path. For example, as shown in FIG. 8(a), when the object images 60b, 60c, 60d are enclosed by the track 64 passing through the position coordinates 71-1 to 71-6 and thus selected, the object image 60b, 60c, 60d are ordered according to the attribute values thereof. In the above, the top object image (the object image 60b, here) may be initially moved to the position coordinate 71-1, or the touch start position, and then moved therefrom along the track 64 to the position coordinate 71-6, with the other object images 60c, 60d aligned in the order according to the attribute valued thereof following the object image 60b. In this case, after the movement, the object images 60b, 60c, 60d are resultantly aligned at the end portion of the track 64 along the track 64 in the order according to the attribute values thereof.

Figure 9:
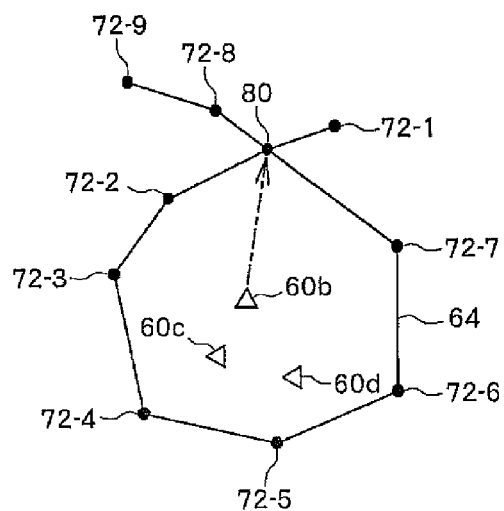
FIG. 9 is a diagram showing a still another path along which the object image moves.

Alternatively, instead of moving the object images 60b to 60e from the start point to the end point of the track 64, the object images 60b, 60c, 60d may be moved as follows. As shown in FIG. 9, when the object image 60b, 60c, 60d are enclosed by the track 64 passing through the position coordinates 72-1 to 72-9 and thus selected, a cross point 80 of the track 64 may be calculated, and the top object image (the object image 60b, here) of the object images 60b, 60c, 60d aligned according to the attribute values thereof may be moved to the cross point 80, and then moved therefrom along the track 64 to the position coordinate 72-9, or the touch end position. In this case, the object image 60b may be initially moved to either the position coordinate 72-2 and then to the position coordinates 72-3, 72-4, to 72-9, or directly to the position coordinates 72-8, 72-9. In the above, the other object images 60c and 60d may follow the object image 60b, aligned in the order according to the attribute valued thereof. In this case, after the movement, the object images 60b, 60c, 60d are resultantly aligned at the end point of the track 64 along the track 64 in the order according to the attribute value thereof, as shown in FIG. 8(b).

Figure 10:
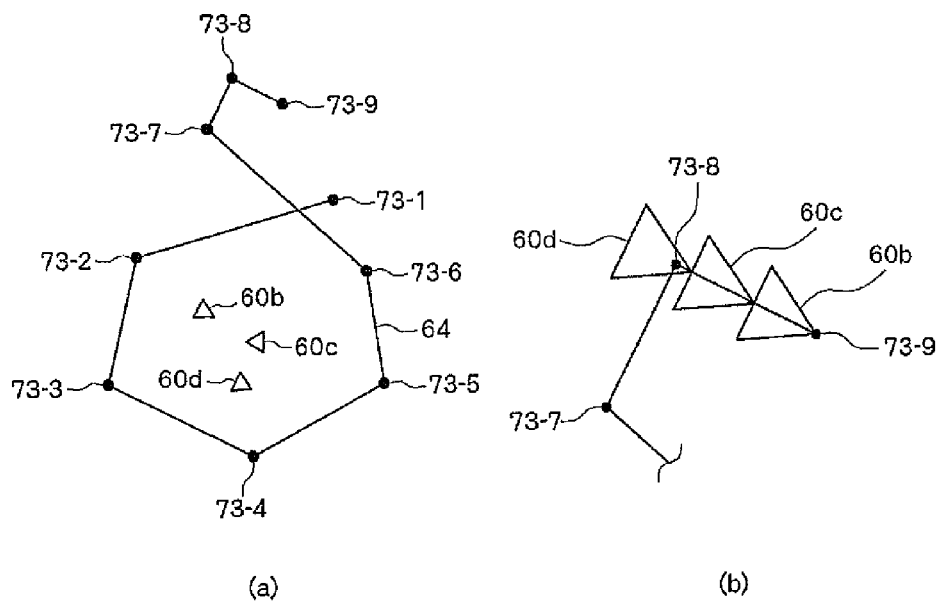
FIG. 10 is a diagram showing yet another path along which the object image moves.

Alternatively, all object images 60b, 60c, 60d having moved may be aligned straight, despite the bending of the track 64, instead of being aligned along the track 64 as shown in FIG. 8(b). That is, when the object images 60b, 60c, 60d are enclosed by the track 64 passing through the position coordinates 73-1 to 73-9 and thereby selected, as shown in FIG. 10(a), the top object image (the object image 60b, here) of the object images 60b, 60c, 60d aligned according to the attribute values thereof may be moved to either the start point, the cross point, or the like of the track 64, and then moved therefrom along the track 64 to the position coordinate 73-9, or the touch end position, with the other object images 60c, 60d aligned in the order according to the attribute values thereof following the object mage 60b. In this case, after the movement, the object images 60b to 60e other than the top object image 60b, namely, the object image 60c and 60d, which follow the top object image 60b, move, displaced from the track 64, to be aligned on a straight line which connects the position coordinates 73-9, or the position coordinates which are input last among those 73-1 to 73-9 which define the track 64, and the position coordinate 73-8, or the position coordinates which are input immediately before the position coordinates 73-9. With the above, the object images 60b, 60c, 60d can be aligned in the order according to the attribute values thereof on a straight line which connects the position coordinates 73-9, or the touch end position, and the position coordinates 73-8, or the position coordinates which are input immediate before the position coordinates 73-9, as shown in FIG. 10(b).

As described above, in aligning the object images 60b, 60c, 60d, at least some of the object images 60b, 60c, 60d are aligned along the track 64. With this arrangement, it is possible to select any of a plurality of images and to designate a designation to which to move the object image, as well as the alignment direction thereof, in a very simple operation.

The invention claimed is:

1. An information processing device, comprising:
   image displaying means for displaying one or more images on a display screen;
   track acquiring means for acquiring a finite track at a position designated by a user on the display screen, wherein the finite track comprises a plurality of connected straight line segments defined by a plurality of points and generated by a microprocessor;
   image selecting means for selecting some or all of the one or more images based on the track acquired by the track acquiring means; and
   image moving means for moving the image selected by the image selecting means to one of the plurality of points in accordance with an edge point of the track acquired by the track acquiring means, wherein said one or more images are determined to be selected when pluralities of virtual straight lines generated by a microprocessor, each of said pluralities of lines intersecting at a respective position of said selected one or more images, each plurality of virtual straight lines associated with said selected one or more images intersects said track at two points, with said selected one or more images being positioned between said two points.

2. The information processing device according to claim 1, wherein the image moving means has means for aligning the images selected by the image selecting means on the display screen according to a predetermined rule.

3. The information processing device according to claim 1, wherein the image selecting means selects an image, among the one or more images, which is enclosed by the track acquired by the track acquiring means.

4. The information processing device according to claim 3, wherein the image moving means has means for aligning the images selected by the image selecting means on the display screen according to a predetermined rule.

5. The information processing device according to claim 1, wherein the image moving means moves the image selected by the image selecting means to an edge point of the track acquired by the track acquiring means.

6. The information processing device according to claim 5, wherein the image moving means has means for aligning the images selected by the image selecting means on the display screen according to a predetermined rule.

7. An information processing method, comprising:
   an image displaying step of displaying one or more images on a display screen;
   a track acquiring step of acquiring a finite track at a position designated by a user on the display screen, wherein the finite track comprises a plurality of connected straight line segments defined by a plurality of points and generated by a microprocessor;
   an image selecting step of selecting some or all of the one or more images based on the track acquired at the track acquiring step; and
   an image moving step of moving the image selected at the image selecting step to one of the plurality of points in accordance with an edge point of the track acquired at the track acquiring step, wherein said one or more images are determined to be selected when pluralities of virtual straight lines generated by a microprocessor, each of said pluralities of lines intersecting at a respective position of said selected one or more images, each plurality of virtual straight lines associated with said selected one or more images intersects said track at two points, with said selected one or more images being positioned between said two points.

8. A non-transitory computer readable information storage medium recording a program for causing a computer to function as: image displaying means for displaying one or more images on a display screen; track acquiring means for acquiring a finite track at a position designated by a user on the display screen, wherein the finite track comprises a plurality of connected straight line segments defined by a plurality of points and generated by a microprocessor; image selecting means for selecting some or all of the one or more images based on the track acquired by the track acquiring means; and image moving means for moving the image selected by the image selecting means to one of the plurality of points in accordance with an edge point of the track acquired by the track acquiring means, wherein said one or more images are determined to be selected when pluralities of virtual straight lines generated by a microprocessor, each of said pluralities of lines intersecting at a respective position of said selected one or more images, each plurality of virtual straight lines associated with said selected one or more images intersects said track at two points, with said selected one or more images being positioned between said two points.

* * * * *